US009293906B2

(12) United States Patent
Kawashima (10) Patent No.: US 9,293,906 B2
(45) Date of Patent: *Mar. 22, 2016

(54) METHOD FOR MANUFACTURING TERMINAL, AND TERMINAL (71) Applicant: DENSO CORPORATION, Kariya, Aichi-pref. (JP)

(72) Inventor: Seizaburou Kawashima, Anjo (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/424,457

(22) PCT Filed: Nov. 5, 2013

(86) PCT No.: PCT/JP2013/006510
§ 371 (c)(1),
(2) Date: Feb. 27, 2015

(87) PCT Pub. No.: WO2014/087575
PCT Pub. Date: Jun. 12, 2014

(65) Prior Publication Data
US 2015/0214712 A1  Jul. 30, 2015

(30) Foreign Application Priority Data

Dec. 3, 2012 (JP) ................................ 2012-264480
Jun. 14, 2013 (JP) ................................ 2013-125969

(51) Int. Cl.
*H01R 13/52* (2006.01)
*H02G 15/04* (2006.01)
(Continued)

(52) U.S. Cl.
CPC .............. *H02G 15/04* (2013.01); *G01F 23/38* (2013.01); *H01R 13/521* (2013.01); *H01R 43/16* (2013.01); *Y10T 29/49224* (2015.01)

(58) Field of Classification Search
CPC .................... H01R 13/5221; H01R 13/2208
USPC .................... 439/274, 275, 587, 588, 589
See application file for complete search history.

(56) References Cited

U.S. PATENT DOCUMENTS 5,273,456 A * 12/1993 Muzslay .............. H01R 13/641
439/188
5,520,553 A * 5/1996 Cecil, Jr. ............. H01R 13/4365
439/595

(Continued)

FOREIGN PATENT DOCUMENTS

JP  H04-324323 A  11/1992
JP  H08-115761 A  5/1996
(Continued)

OTHER PUBLICATIONS

U.S. Appl. No. 14/424,461, filed Feb. 27, 2015, Kawashima.
(Continued)

*Primary Examiner* — Phuongchi T Nguyen
(74) *Attorney, Agent, or Firm* — Posz Law Group, PLC (57) ABSTRACT A method for manufacturing a terminal includes: an electrically conductive member that has electrical connections, which are respectively formed at end portions of the electrically conductive member, wherein the electrical connections are respectively connectable with a lead wire and a terminal of a Hall IC; and a seal film that is formed in a surface of an intermediate portion of the electrically conductive member. In the method for manufacturing, end portions of a planar rod having a rectangular cross section are respectively used as the electrical connections, and an intermediate portion of the planar rod is processed such that corners of the rectangular cross section are rounded. Thereafter, a liquid seal agent is coated on the intermediate portion. Furthermore, the coated liquid seal agent is solidified to form a seal film.

9 Claims, 9 Drawing Sheets (51) Int. Cl.
*G01F 23/38* (2006.01)
*H01R 43/16* (2006.01)

(56) References Cited

U.S. PATENT DOCUMENTS

| | | | |
|---|---|---|---|
| 5,964,622 A | 10/1999 | Ishikawa et al. | |
| 6,325,669 B1* | 12/2001 | Safai | H01R 13/5208 439/274 |
| 2005/0247124 A1 | 11/2005 | Fukuhara et al. | |
| 2015/0207253 A1* | 7/2015 | Kawashima | G01F 23/38 439/884 |

FOREIGN PATENT DOCUMENTS

| | | |
|---|---|---|
| JP | 2003-109702 A | 4/2003 |
| JP | 2007-220484 A | 8/2007 |
| WO | 2014/080579 A1 | 5/2014 |

OTHER PUBLICATIONS

International Search Report and Written Opinion of the International Searching Authority dated Feb. 10, 2014 issued in the corresponding International application No. PCT/JP2013/006510 (and English translation).

* cited by examiner

METHOD FOR MANUFACTURING TERMINAL, AND TERMINAL

CROSS REFERENCE TO RELATED APPLICATION

This application is a U.S. national stage of International Application No. PCT/JP2013/006510 filed on Nov. 5, 2013 and is based on and incorporates herein by reference Japanese Patent Application No. 2012-264480 filed on Dec. 3, 2012 and Japanese Patent Application No. 2013-125969 filed on Jun. 14, 2013.

TECHNICAL FIELD

The present disclosure relates to a terminal, to which an external electrical conductor, such as a lead wire, is connected, and a method for manufacturing the terminal.

BACKGROUND ART

The Patent Literature 1 discloses a terminal, which is arranged to extend from an inside to an outside of a housing made of a resin material in a liquid level sensing apparatus placed in a fuel tank. A seal film is formed in a portion of the terminal, which contacts the housing, to limit intrusion of the fuel into the inside of the housing through a gap between the terminal and the housing. Specifically, a liquid seal agent is coated on a surface of the terminal, and this coated liquid seal agent is solidified to form the seal film.

Figure 17:
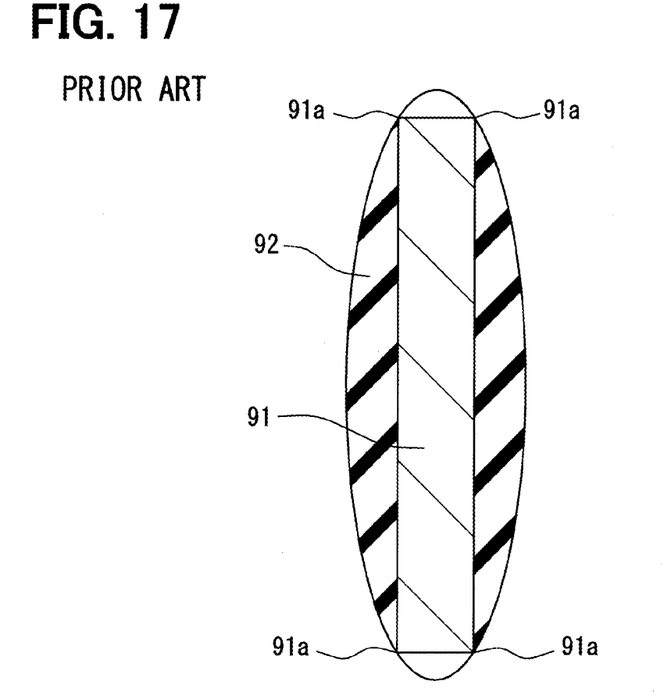
FIG. 17 is a cross sectional view of a prior art terminal.

As shown in FIG. 17, the cross section of this type of terminal 91 is often configured into a rectangular shape. One reason for this configuration is that an electrical connection of an external terminal or lead wire (external electrical conductor) to an end portion of the terminal 91 can be easily made. Specifically, when the end portion is configured into a planar plate form, the end portion can be easily, plastically deformed to crimp the lead wire onto the end portion. Alternately, the end portion can be easily electrically connected to the external terminal by welding or soldering. Also, it is easy to implement a structure for electrically connecting the end portion to the external terminal by forming the end portion as a male contact and the external terminal as a female contact.

However, it is found that when a seal film 92 is formed on the terminal 91, which has the rectangular cross section, the following disadvantage may occur. Specifically, in a surface of the terminal 91, at each of four edge lines (edges 91a), which are located at four corners, respectively, of a rectangular cross section of the terminal 91 and extend in a longitudinal direction of the terminal 91 (a direction perpendicular to the plane of FIG. 17), a film thickness of the seal film 92 is thinned due to a surface tension of the liquid seal agent at the time of coating the liquid seal agent on the terminal 91. When the thin portion, which has the thin film thickness, is formed in the seal film 92, a sufficient sealing performance cannot be achieved.

Particularly, a selectable material of the liquid seal agent is limited to, for example, a material that is not deteriorated even upon exposure to the fuel, and thereby a material, which has a large viscosity, cannot be selected as the material of the liquid seal agent. In such a case, the thinning of the film thickness of the seal film 92 on the edge 91a becomes particularly prominent.

CITATION LIST

Patent Literature

PATENT LITERATURE 1: JPH04-324323A

SUMMARY OF THE INVENTION

The present disclosure is made in view of the above disadvantage, and it is an objective of the present disclosure to provide a method for manufacturing a terminal or the terminal, which alleviates thinning of a seal film while allowing easy electrical connection of the terminal with an external electrical conductor.

To achieve the above objective, according to the present disclosure, there is provided a method for manufacturing a terminal that includes: an electrically conductive member that has an electrical connection, which is formed at an end portion of the electrically conductive member, wherein the electrical connection is connectable with an external electrical conductor; and a seal film that is formed in a surface of a predetermined portion of the electrically conductive member, which is other than the electrical connection. In the method of manufacturing, the electrically conductive member is formed by processing a planar rod, which has a rectangular cross section, such that each of four corners of the rectangular cross section of a corresponding portion of the planar rod, which is other than an end portion of the planar rod, is rounded to form the predetermined portion of the electrically conductive member, while the end portion of the planar rod, which has the rectangular cross section, is made as the electrical connection. Thereafter, a liquid seal agent is coated on the predetermined portion. Then, the liquid seal agent, which is coated on the predetermined portion, is solidified to form the seal film.

Furthermore, to achieve the above objective, according to the present disclosure, there is provided a terminal that includes: an electrically conductive member that has an electrical connection, which is formed at an end portion of the electrically conductive member, wherein the electrical connection is connectable with an external electrical conductor; and a seal film that is formed in a surface of a predetermined portion of the electrically conductive member, which is other than the electrical connection. The electrical connection has a cross section having a rectangular shape, and the predetermined portion has a cross section having a shape that is formed by rounding each of four corners of a rectangle.

DESCRIPTION OF EMBODIMENTS

Hereinafter, a terminal and a method for manufacturing the terminal of the respective embodiments of the present disclosure will be described with reference to the drawings. In the following respective embodiments, portions, which are described in a previous embodiment(s), will be indicated by the same reference numerals as those of the previous embodiment(s) and will not be redundantly described in some cases. In each of the following embodiments, if only a part of a structure is described, the remaining part of the structure is the same as that of the previously described embodiment(s). In each of the following embodiments, besides the explicitly described combination(s) of the portions, it should be noted that the following embodiments may be partially combined unless such a combination causes a particular disadvantage.
(First Embodiment)

Figure 1:
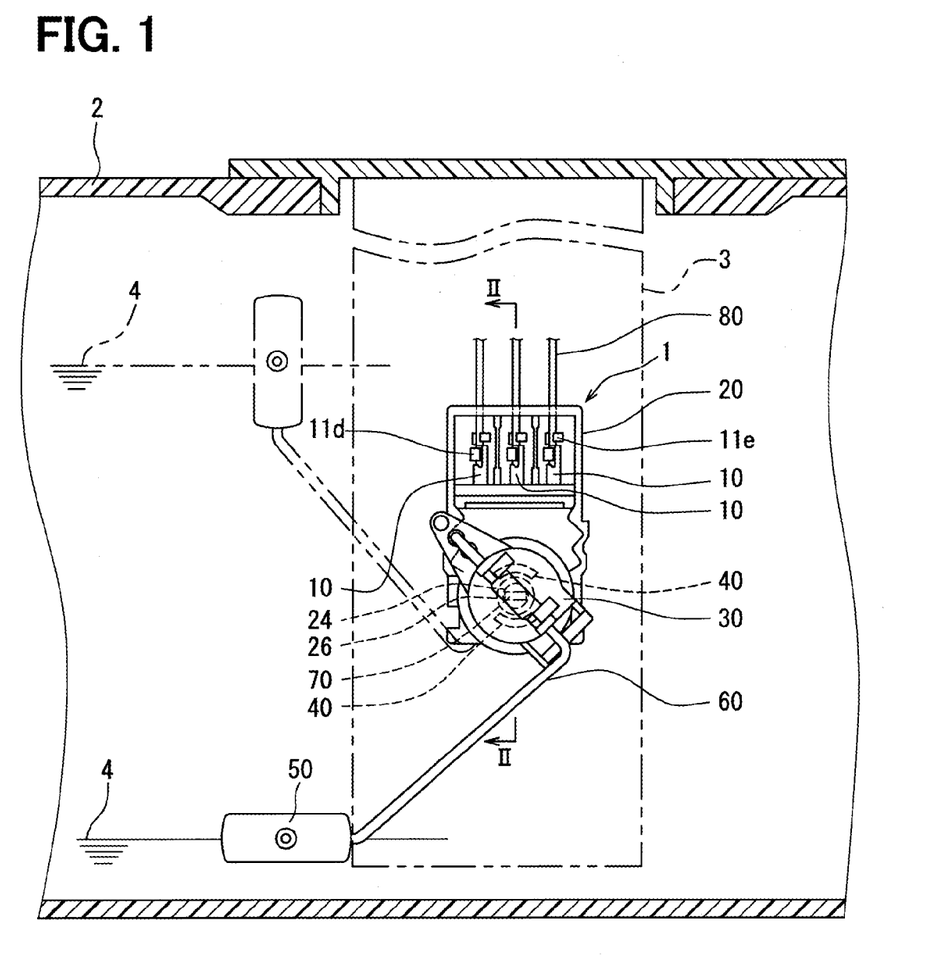
FIG. 1 is a front view of a liquid level sensing apparatus having terminals according to a first embodiment of the present disclosure.

As shown in FIG. 1, terminals 10 of the present embodiment are used in a liquid level sensing apparatus 1.
(Structure of Liquid Level Sensing Apparatus)

First of all, a structure of the liquid level sensing apparatus 1 will be described in detail.

The liquid level sensing apparatus 1 is received in a fuel tank 2, which stores liquid fuel in a vehicle. The liquid level sensing apparatus 1 is supported, for example, by a fuel pump module 3 at a position, at which the liquid level sensing apparatus 1 is immersed in the fuel in the fuel tank 2. In this supported state, the liquid level sensing apparatus 1 senses a level of a surface 4 of the fuel in the fuel tank 2.

Figure 2:
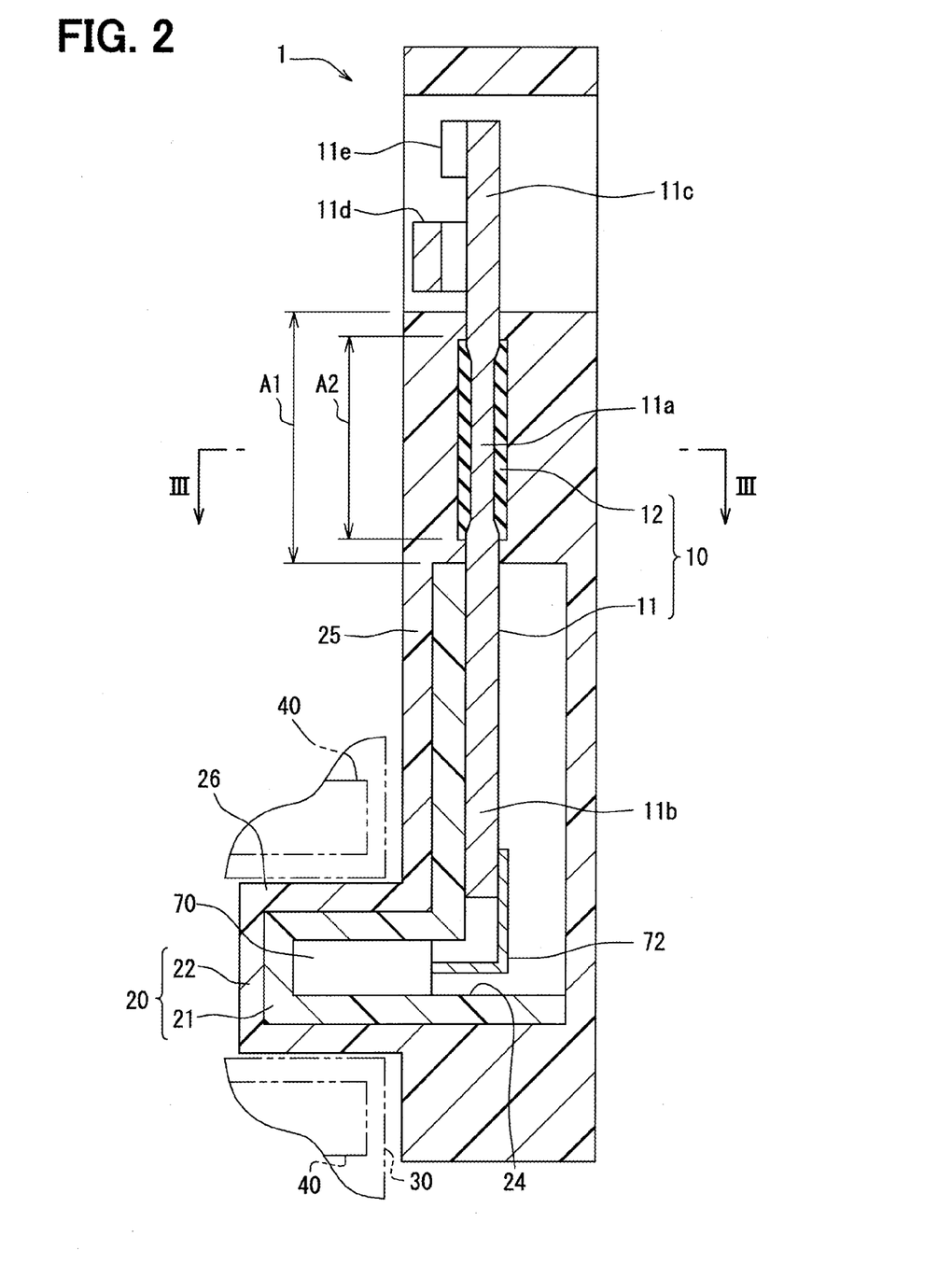
FIG. 2 is a cross-sectional view taken along line II-II in FIG. 1.

As indicated in FIGS. 1 and 2, the liquid level sensing apparatus 1 includes a housing 20, a plurality of terminals 10, a magnet holder 30, a plurality of magnets 40, a float 50, a float arm 60 and a Hall IC 70.

As shown in FIG. 2, the housing 20 includes an inner case 21 and an outer case 22. The inner case 21 is made of a resin material, such as polyphenylene sulfide resin. The inner case 21 includes a hollow receiving chamber 24. The outer case 22 is made of a resin material, such as polyphenylene sulfide resin. The outer case 22 surrounds the inner case 21, which is embedded in an inside of the outer case 22. The outer case 22 includes a base portion 25 and a bearing portion 26. The base portion 25 extends in a form of a thick plate. The bearing portion 26 projects in a form of a boss from the base portion 25.

The multiple terminals 10 are arranged to extend from an inside (the receiving chamber 24) of the housing 20 to an outside of the housing 20 (see FIG. 1). Each terminal 10 is formed by forming a seal film 12 on an electrically conductive member 11. One end portion 11b of the terminal 10 (the electrically conductive member 11), which is located at one end of the terminal 10 in a longitudinal direction, projects in the receiving chamber 24, and the other end portion 11c of the terminal 10, which is located at the other end of the terminal 10 in the longitudinal direction, is exposed to an outside of the base portion 25. An intermediate portion (a predetermined portion) 11a of the electrically conductive member 11, which is located between the one end portion 11b and the other end portion 11c, is embedded in the inside of the base portion 25.

The seal film 12 seals between the electrically conductive member 11 and the base portion 25. Specifically, the seal film 12 is formed such that even when the base portion 25 is shrunk in a direction away from the electrically conductive member 11 due to deterioration over time, the seal film 12 maintains the sealing between the electrically conductive member 11 and the base portion 25 in a manner that limits formation of a gap between the electrically conductive member 11 and the base portion 25. Specifically, the seal film 12, which has been elastically deformed in a compressing direction of the seal film 12, is expanded to follow the shrinking of the base portion 25, so that the seal film 12 seals the gap discussed above. In this way, conduction of the fuel into the inside of the housing 20 along the terminal 10 is limited.

Thereby, the material of the seal film 12 needs to be elastically deformable to an extent that allows the seal film 12 to follow the shrinking of the base portion 25, and the material of the seal film 12 also needs to have oil resistance for limiting deterioration caused by the fuel. A specific example of the material of the seal film 12 is a rubber material, such as epichlorhydrin rubber, fluororubber, or nitrile rubber. The material of the electrically conductive member 11 is required to have the oil resistance for limiting the deterioration caused by the fuel as well as the electric conductivity. A specific example of the material of the electrically conductive member 11 is a metal material, such as bronze (e.g., phosphor bronze) or brass.

Figure 3:
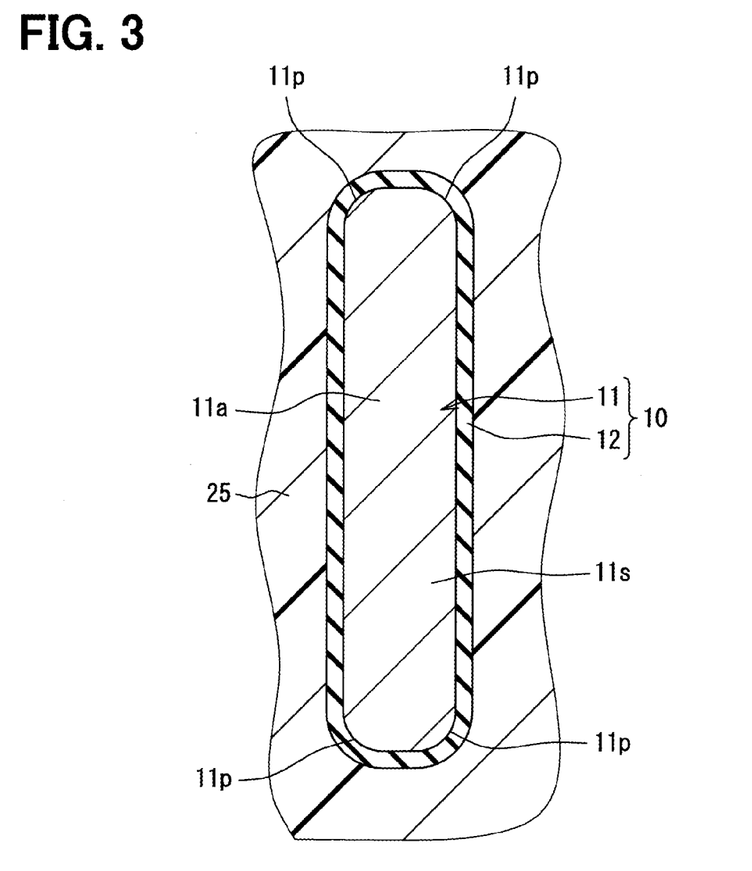
FIG. 3 is an enlarged cross-sectional view taken along line III-III in FIG. 2.
Figure 12:
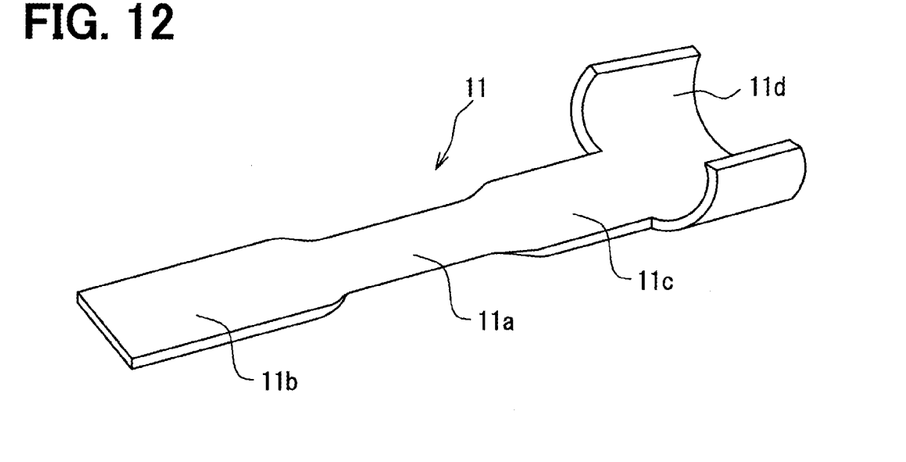
FIG. 12 is a perspective view of the terminal of the first embodiment produced through the procedure of FIG. 4, showing a state where the seal film is omitted.

As shown in FIGS. 3 and 12, a cross section 11s of the intermediate portion 11a, which is taken in a direction perpendicular to a longitudinal direction of the electrically conductive member 11, is configured into a rectangular shape that has round corners. A cross section of the one end portion 11b and a cross section of the other end portion 11c, each of which is taken in the direction perpendicular to the longitudinal direction, are configured into a rectangular shape (a planar shape) that has four right angle corners. In these cross sections, a center of the intermediate portion 11a coincides with a center of each end portion 11b, 11c.

The seal film 12 is configured to extend like a ring along the surface of the intermediate portion 11a. With reference to FIG. 2, it is now assumed that in a longitudinal direction of the terminal 10 (a top-to-bottom direction in FIG. 2), a range of a part of the base portion 25, through which the terminal 10 extends, is referred to as a range A1, and a range of the intermediate portion 11a is referred to as a range A2. In such a case, the terminal 10 is arranged such that the range A2 is placed within the range A1. In other words, the range A2 of the seal film 12 is included in the range A1.

A corresponding one of terminals 72 of the Hall IC 70 is electrically connected to a planar surface of the one end portion 11b by welding or soldering. A lead wire 80 is electrically connected to a planar surface of the other end portion 11c by crimping. Specifically, as shown in FIGS. 1 and 2, a crimp contact part 11d and a securing part 11e are formed in the other end portion 11c. An electrically conductive portion of the lead wire 80 is clamped between the crimp contact part 11d and the other end portion 11c and is thereby crimped. In this way, the lead wire 80 and the terminal 10 are electrically connected with each other.

A sheath of the lead wire 80, which covers the electrically conductive portion of the lead wire 80, is clamped between the securing part 11e and other end portion 11c and is thereby securely held. There are three lead wires 80, which include a signal line for outputting a measurement signal of the Hall IC 70, a power sully line for supplying an electric power to the Hall IC 70, and a ground line. The terminals 72 of the Hall IC 70 and the lead wires 80 serve as external electrical conductors, and the one end portion 11b and the other end portion 11c serve as electrical connections.

With reference to FIGS. 1 and 2, the magnet holder 30 is made of a resin material, such as polyacetal resin. The magnet holder 30 is rotatably supported by the bearing portion 26. There is formed a pair of magnets 40 from a ferromagnetic material, such as ferrite magnet. Each magnet 40 is embedded in the magnet holder 30 to enable integral rotation of the magnet 40 with the magnet holder 30.

With reference to FIG. 1, the float 50 is made of a light weight material, such as porous ebonite, so that the float 50 has a relative density, which is smaller than that of the fuel. The float 50 can float on the surface 4 of the fuel in the fuel tank 2. The float arm 60 is made of a metal material, such as stainless steel, and is configured into a wire rod form. The float arm 60 connects between the float 50 and the magnet holder 30. With this connection, the magnet holder 30 is rotated relative to the housing 20 in response to upward or downward movement of the float 50, which floats on the surface 4.

As shown in FIGS. 1 and 2, the Hall IC 70 is a magnetic sensing element that senses a magnetic field and generates a signal, which corresponds to the sensed magnetic field. The Hall IC 70 is received in the receiving chamber 24, so that the Hall IC 70 is held between the pair of magnets 40. As shown in FIG. 1, the Hall IC 70 has the multiple terminals 72, which are connected to the terminals 10, respectively. In an energized state of the Hall IC 70, which is powered from the outside, the Hall IC 70 senses the magnetic field generated between the magnets 40, and thereby the Hall IC 70 outputs the generated signal to the outside of the fuel tank 2 through the predetermined terminal 72, the predetermined terminal 10 and the predetermined lead wire 80. The magnetic field, which is sensed with the Hall IC 70, changes in response to the relative rotational angle of the magnet holder 30 relative to the housing 20, i.e., changes in response to the upward or downward movement of the float 50. Thus, the level of the surface 4 of the fuel, on which the float 50 floats, can be sensed based on the output signal from the Hall IC 70.

(Method for Manufacturing Terminal)

Next, a method for manufacturing the terminals 10 used in the liquid level sensing apparatus 1 will be described according to a manufacturing flow of FIG. 4 with reference to FIGS. 5 to 12. A top-to-bottom direction of FIGS. 8 and 9 substantially coincides with the vertical direction of the manufacturing environment.

Figure 4:
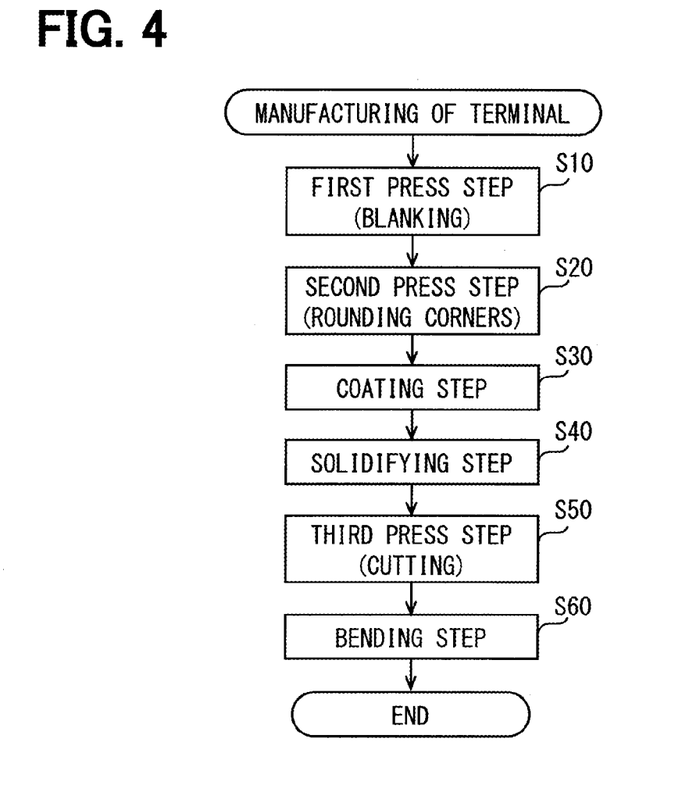
FIG. 4 is a flowchart showing a manufacturing procedure of the terminals of the first embodiment shown in FIGS. 2 and 3.
Figure 5:
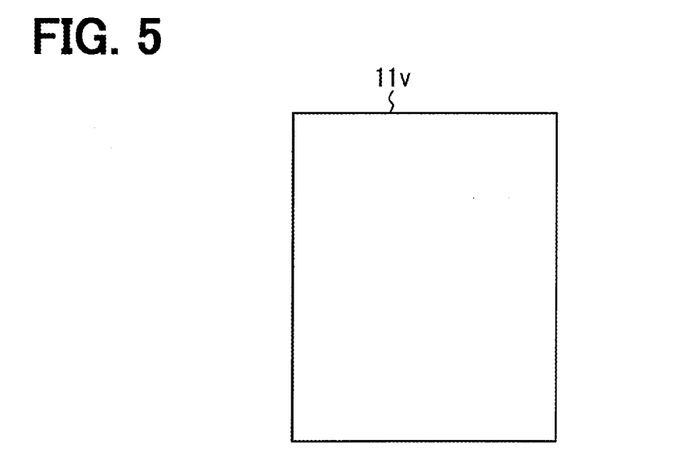
FIG. 5 is a front view of a plate material before a first press step of the first embodiment shown in FIG. 4.
Figure 6:
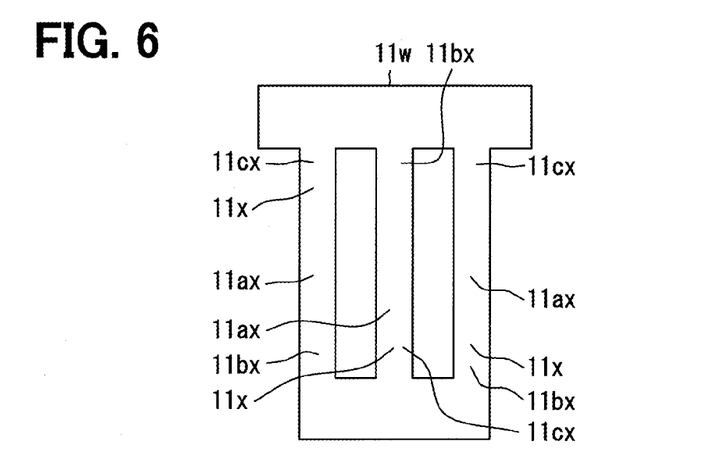
FIG. 6 is a front view of an intermediately shaped product after the first press step of the first embodiment shown in FIG. 4.

In the manufacturing flow shown in FIG. 4, first of all, an intermediately shaped product 11w shown in FIG. 6 is produced from a plate material 11v shown in FIG. 5 at a first press step S10 (an intermediate manufacturing step). Specifically, the plate material 11v is pressed to form the intermediately shaped product 11w, in which a plurality (three in the example shown in FIG. 6) of planar rods 11x each having a rectangular cross section 11sx is joined together. A length of the intermediately shaped product 11w, which is measured in a longitudinal direction of the intermediately shaped product 11w, coincides with a length of the terminals 10, which is measured in a longitudinal direction of the terminals 10.

Figure 7:
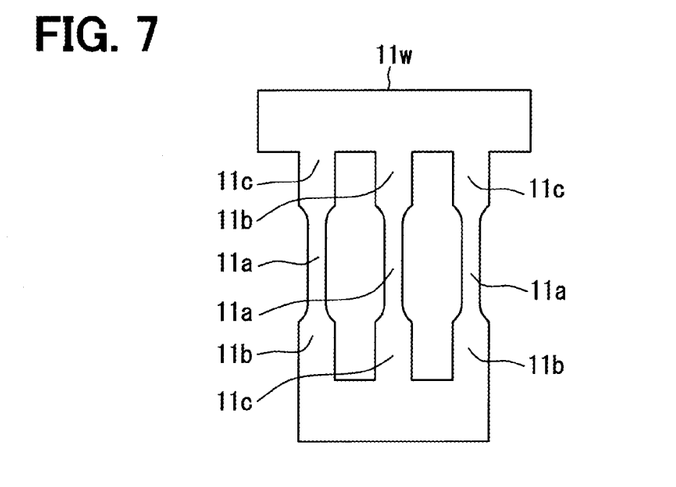
FIG. 7 is a front view of the intermediately shaped product after a second press step of the first embodiment shown in FIG. 4.
Figure 8:
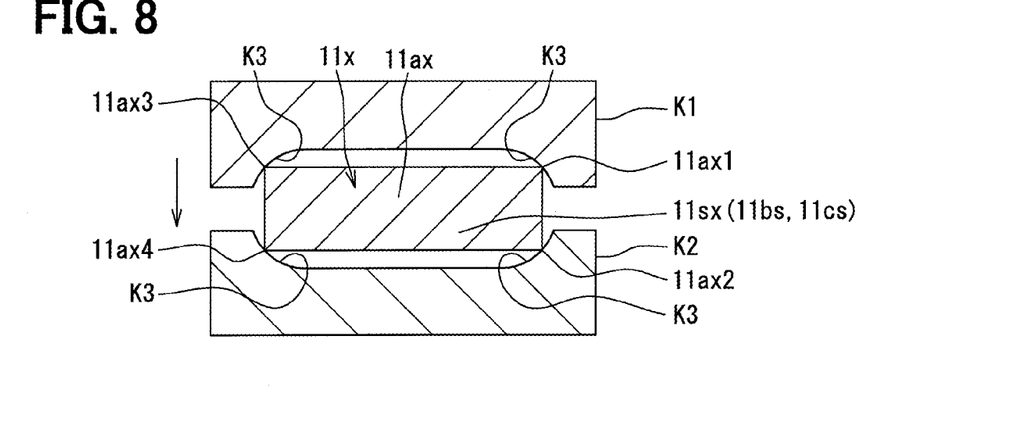
FIG. 8 is a cross sectional view, showing a state of dies used in the second press step of the first embodiment shown in FIG. 4 before press working.
Figure 9:
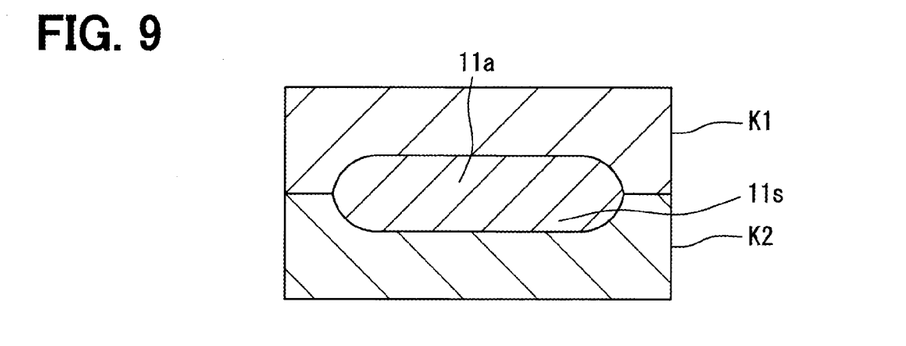
FIG. 9 is a cross sectional view, showing a state of the dies used in the second press step of the first embodiment shown in FIG. 4 after the press working.

Next, an intermediate portion 11ax of each of the planar rods 11x is processed such that corners 11ax1-11ax4 of a rectangular cross section 11sx of the planar rod 11x is rounded at a second press step S20 (a processing step) (see FIG. 7). Specifically, as shown in FIG. 8, the intermediately shaped product 11w is set between an upper die K1 and a lower die K2 of a press machine. The pair of dies K1, K2 discussed above is formed such that four portions, i.e., four press surfaces K3, each of which is opposed to a corresponding one of the four corners 11ax1-11ax4 of the rectangular cross section 11sx of the intermediate portion 11ax, are respectively configured into an arcuate shape. As indicated by an arrow in FIG. 8, the upper die K1 is lowered and is pressed, so that as shown in FIG. 9, the four corners 11ax1-11ax4 of the intermediate portion 11ax of the planar rod 11x, which corresponds to the intermediate portion 11a of the electrically conductive member 11, are simultaneously rounded.

The press working is not performed on end portions 11bx, 11cx of each planar rod 11x, so that a cross section 11bs, 11cs of each of the end portions 11b, 11c of the electrically conductive member 11 remains as a rectangular cross section (a substantially the same shape as that of the cross section 11sx of the planar rod 11x shown in FIG. 8). Specifically, the end portions 11bx, 11cx of the planar rod 11x of the intermediately shaped product 11w correspond to the end portions 11b, 11c of the electrically conductive member 11 and serve as electrical connections, respectively. The cross section 11bs of the one end portion 11b is a cross section of a part of the one end portion 11b that is located between the intermediate portion 11a and an end of the one end portion 11b, which is opposite from the intermediate portion 11a, shown in FIG. 12. Furthermore, the cross section 11cx of the other end portion 11c is a cross section of a part of the other end portion 11c, which is located between the intermediate portion 11a and the crimp contact part 11d of the other end portion 11c, shown in FIG. 12.

Figure 10:
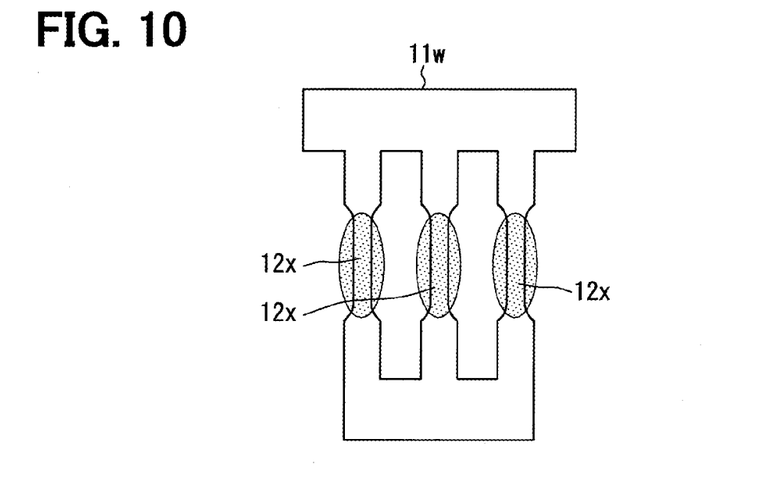
FIG. 10 is a front view of the intermediately shaped product after a coating step of the first embodiment shown in FIG. 4.

Next, at a coating step S30, as shown in FIG. 10, a liquid seal agent 12x, which is supplied from an outlet of an undepicted dispenser (a liquid metering and outputting device), is coated on the intermediate portion 11a. The liquid seal agent 12x is formed by diluting an unvulcanized rubber material, such as epichlorhydrin rubber, fluororubber, or nitrile rubber, with a solvent, such as toluene.

Next, at a solidifying step S40, the liquid seal agent 12x, which is coated on the intermediate portion 11a, is solidified. Specifically, the liquid seal agent 12x may be naturally dried under the normal temperature or may be forcefully dried with application of heat. In this way, the solvent of the liquid seal agent 12x is evaporated, so that the liquid seal agent 12x is solidified. Furthermore, at the solidifying step S40, the electrically conductive member 11, which is coated with the liquid seal agent 12x, is placed in a heating furnace (not shown) and is baked in a baking step. For example, the baking step may be performed by heating the electrically conductive member 11 for about thirty minutes under the temperature of 150 degrees Celsius. In this way, the rubber material in the liquid seal agent 12x is cross-linked, and thereby the liquid seal agent 12x is solidified to form the seal film 12, as shown in FIG. 11.

Figure 11:
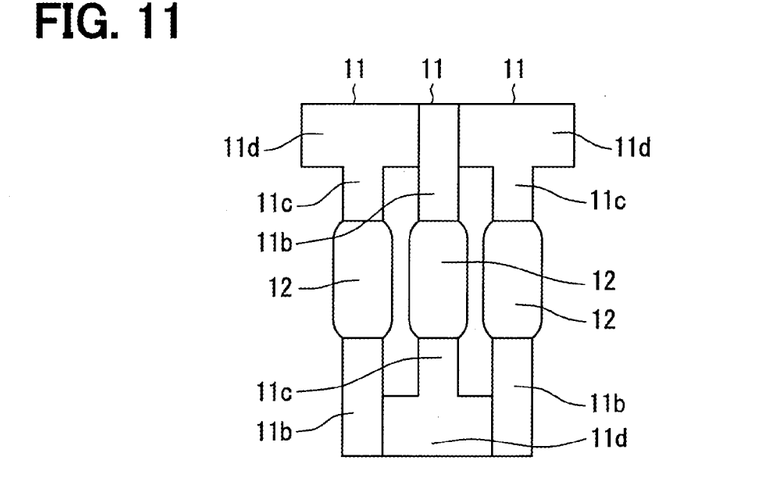
FIG. 11 is a front view of the intermediately shaped product after a solidifying step of the first embodiment shown in FIG. 4.

Next, at a third press step S50, the intermediately shaped product 11w is pressed and is cut to form the three electrically conductive members 11, as shown in FIG. 11. In FIG. 11, for the purpose of easy understanding, the three electrically conductive members 11, which are cut and are separated from each other, are placed adjacent to each other. Thereafter, at a bending step S60, the end portion 11c is bent to form the crimp contact part 11d and the securing part 11e.

Through the above-described manufacturing flow, each of the cross sections 11bs, 11cs of the electrical connections, i.e., the end portions 11b, 11c of the electrically conductive member 11 has the rectangular shape, and the cross section of the intermediate portion 11a of the electrically conductive member 11 is configured into the rounded shape, in which the corners of the rectangular cross section are rounded. Furthermore, the seal film 12 is formed in the intermediate portion 11a of the electrically conductive member 11. In this way, the manufacturing of the terminals 10 is completed.

The terminals 10, which are manufactured in the above-described manner, are placed in a resin molding die, which is used for the resin molding of the base portion 25, and the terminals 10 are insert molded integrally with the base portion 25. Due to the pressure of the molten resin in the molding die at the time of resin molding, the seal film 12 of each terminal 10 is compressed and is elastically deformed. Thereby, the terminals 10 are embedded in the base portion 25 in the state where the seal film 12 of each terminal 10 is elastically deformed. Thus, even when the base portion 25 is shrunk by the heat or is shrunk due to deterioration of the base portion 25 over time, the seal film 12 is expanded to follow the shrinking of the base portion 25. Thereby, the seal film 12 can perform its seal function in such a manner that the seal film 12 limits formation of a gap between the terminal 10 and the base portion 25.

As discussed above, according to the present embodiment, the intermediate portion 11ax of the planar rod 11x is processed through the press working such that the corners of the rectangular cross section 11sx of the intermediate portion 11ax are rounded (see the rounded corners indicated by reference numeral 11p in FIG. 3). Therefore, edges 91a, which are exemplified in FIG. 17, are absent in the intermediate portion 11a of the electrically conductive member 11, which is coated with the liquid seal agent 12x. Thus, it is possible to eliminate the thinning of the film thickness of the seal film 12, which is caused by the surface tension of the liquid seal agent 12x at the time of performing the coating step S30.

Furthermore, the end portions 11b, 11c, which serve as the electrical connections, are not processed to round the corners of the rectangular cross section of each of the end portions 11b, 11c. Thus, each of the cross sections 11bs, 11cs of the end portions 11b, 11c is the rectangular shape like the cross section of the planar rod 11x, so that the end portions 11b, 11c have the form, in which the wide planar surface is ensured. As a result, at the time of electrically connecting the terminal 72 of the Hall IC 70 to the one end portion 11b by the welding or the soldering, the connecting operation efficiency can be improved. Furthermore, the process of forming of the crimp contact part 11d and the securing part 11e can be easily implemented before the time of electrically connecting the lead wire 80 to the other end portion 11b by the crimping. Thereby, the electrical connection by the crimping discussed above can be easily achieved.

Furthermore, the present embodiment, which has the following characteristics, can achieve the following advantages due to the following characteristics.

(1) The manufacturing method of the present embodiment includes the intermediate manufacturing step, i.e., the first press step S10 for forming the intermediately shaped product 11w, in which the multiple planar rods 11x are joined together, through the press working of the plate material 11v. Furthermore, in the second press step S20 (the processing step), the intermediately shaped product 11w is processed through the press working such that the corners 11ax1-11ax4 of the intermediate portions (predetermined portions) 11ax of the multiple planar rods 11x are simultaneously rounded. Therefore, the intermediate portions 11ax of the multiple planar rods 11x can be simultaneously processed by executing the second press step S20 only once. Thus, the processing efficiency can be improved.

(2) According to the manufacturing method of the present embodiment, at the second press step S20 (the processing step), each planar rod 11x is processed through the press working by using the pair of dies K1, K2 that have the four portions, i.e., the four press surfaces K3, which are opposed to the four corners 11ax1-11ax4 of the rectangular cross section 11sx of the intermediate portion (predetermined portion) 11ax of the planar rod 11x. Thereby, the four corners 11ax1-11ax4 of the rectangular cross section 11sx can be simultaneously rounded. In this way, since the four corners 11ax1-11ax4 are simultaneously processed, the processing efficiency can be improved.

(3) The terminals 10 of the present embodiment are arranged such that each terminal 10 extends from the inside of the housing 20 placed in the environment exposed to the liquid fuel to the outside of the housing 20, and the seal film 12 seals between the housing 20 and the electrically conducting member 11 of the terminal 10.

In the case where the terminal 10 is exposed to the fuel, the material of the liquid seal agent 12x is required to have the oil resistance for withstanding the property modification of the material by the fuel. However, the material, which can satisfy such a requirement and has realistic costs, is limited to ones that have low viscosities. In the case where the liquid seal agent 12x, which has the low viscosity, is used, when the edges 91a, which are exemplified in FIG. 17, are present, the film thickness of the seal film 92 is disadvantageously thinned, as discussed above. Thus, when the intermediate portion 11a, which has the cross section 11s having the rounded corners, is formed in the terminal 10, which is used in the environment exposed to the fuel, the above discussed objective can be appropriately achieved.

(Second Embodiment)

Figure 13:
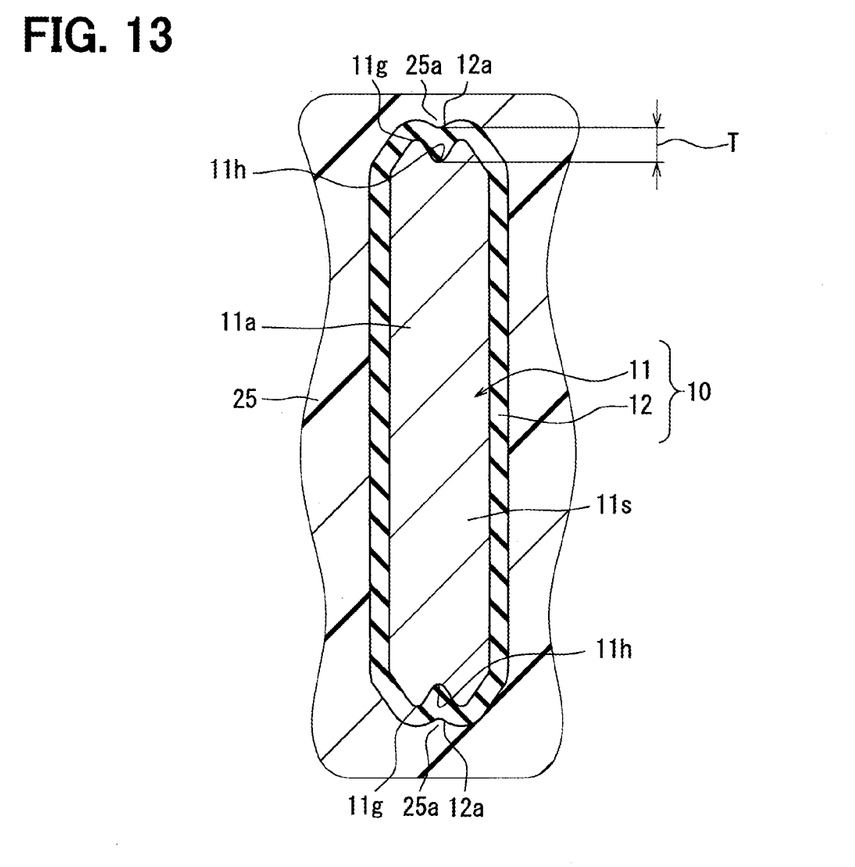
FIG. 13 is a cross sectional view, showing a state where a terminal of a second embodiment of the present disclosure, is insert molded in a housing.

In the cross section 11s of the intermediate portion 11a of the electrically conductive member 11 according to the first embodiment, two opposed end surfaces, which are opposed to each other in the longitudinal direction of the cross section 11s, are planar except the rounded corners 11p (see FIG. 3). In contrast, according to the present embodiment, as shown in FIG. 13, a groove 11h is formed in each of two end surfaces 11g of the cross section 11s of the intermediate portion 11a of the electrically conductive member 11. The end surfaces 11g, in each of which the groove 11h is formed, are two end surfaces (an upper end surface and a lower end surface in FIG. 13), which are opposed to each other in the longitudinal direction (the top-to-bottom direction in FIG. 13) of the cross section 11s of the intermediate portion 11a. The groove 11h extends in the axial direction of the terminal 10, i.e., in the longitudinal direction of the terminal 10 (the direction perpendicular to the plane of FIG. 13) and is formed along an entire range A2 of the intermediate portion 11a.

Furthermore, the seal film 12 of the present embodiment has recesses 12a, each of which is recessed along a corresponding one of the grooves 11h. The base portion 25, which is made of the resin material, is filled in the recesses 12a of the seal film 12. A thickness T of a corresponding portion of the seal film 12, which is located in the corresponding recess 12a, is larger than that of the rest of the seal film 12, which is other than the recesses 12a.

In the second press step S20 (the processing step) of the present embodiment, the intermediate portion 11ax of the planar rod 11x is processed to round the corners of the rectangular cross section 11sx of the intermediate portion 11ax, and at the same time, the groove 11h is formed in each of the end surfaces 11gx of the intermediate portion 11ax. Hereinafter, a method of forming the grooves 11h will be described with reference to FIGS. 14 and 15.

Figure 14:
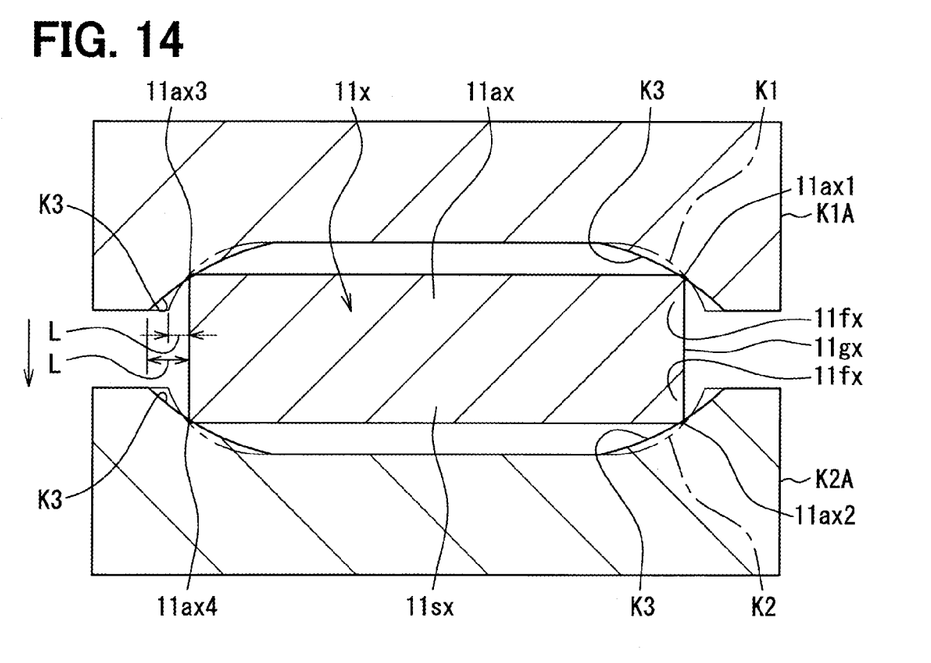
FIG. 14 is a cross sectional view, showing a state of dies used in a second press step of the second embodiment before press working.
Figure 15:
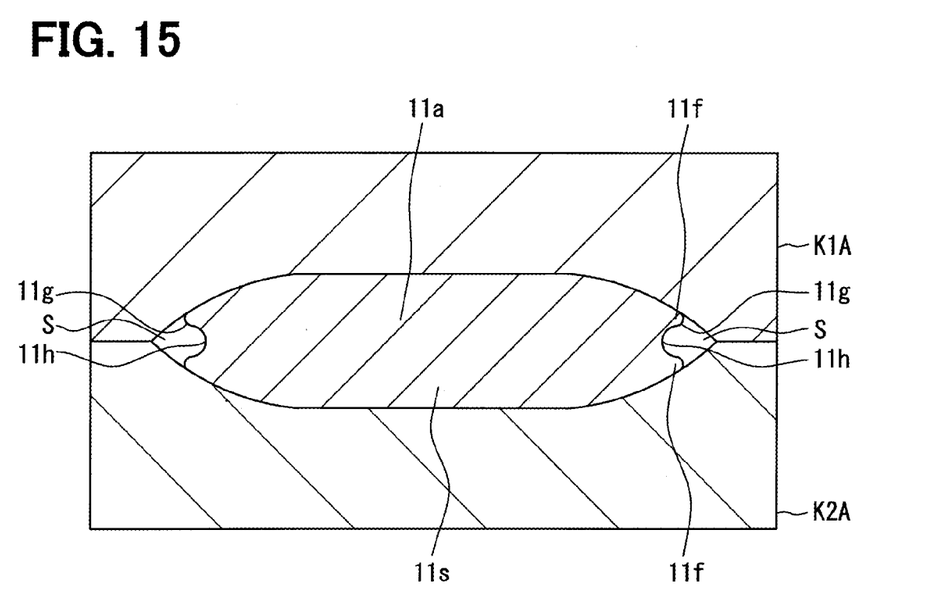
FIG. 15 is a cross sectional view, showing a state of the dies used in the second press step of the second embodiment after the press working.

A dot-dash line in FIG. 14 indicates the dies K1, K2 of the press machine of the first embodiment, and a solid line in FIG. 14 indicates dies K1A, K2A of a press machine of the present embodiment. As indicated in FIG. 14, four portions (press surfaces K3) of the dies K1A, K2A, which are opposed to the edges of the planar rod 11x, i.e., the corners 11ax1-11ax4 of the planar rod 11x, are configured into an arcuate shape. The dies K1A, K2A of the present embodiment are formed such that the press surfaces K3 of the dies K1A, K2A are longer than the press surfaces K3 of the dies K1, K2 of the first embodiment.

Specifically, a projecting length L of each press surface K3, which projects from the corresponding corner 11ax1-11ax4, in the longitudinal direction of the cross section 11sx in a state where the corners 11ax1-11ax4 of the intermediate portion 11ax of the planar rod 11x begin to contact the dies K1A, K2A (a state shown in FIG. 14), is set to be longer than that of the first embodiment. Therefore, in a state of FIG. 15, which is a state upon completion of the lowering of the upper die K1A, a space S is present between the end surface 11g of the intermediate portion 11a and the press surface K3.

When downward movement of the upper die K1A begins from the state shown in FIG. 14, a corresponding part (a corresponding corner part 110 of the intermediate portion 11ax of the planar rod 11x, which is located adjacent to the corresponding corner 11ax1-11ax4 of the intermediate portion 11ax, is pressed by the corresponding press surface K3 and is thereby plastically deformed. Specifically, the corner part 11fx is plastically deformed along the press surface K3 to protrude in the longitudinal direction of the rectangular cross section 11sx (the left-to-right direction in FIG. 14). The corner parts 11fx, which are located at the four corners, respectively, of the rectangular cross section 11sx of the intermediate portion 11a of the electrically conductive member 11, are protruded, so that the groove 11h is formed between the two corner parts 11f at each of the two end portions of the cross section 11sx, which are opposed to each other in the longitudinal direction of the cross section 11sx.

Here, in the case of the first embodiment, in which the space S is absent between each two corner parts 11f, at the time immediately after the begging of the downward movement of the upper die K1A, the corner parts 11f protrude to form the groove 11h between the corner parts 11f. However, when the upper die K1A is further moved downward, the protruded corner parts 11f are crashed by the press surfaces K3 due to the absence of the space S between the corner parts 11f, so that the corner parts 11f are plastically deformed in the direction of filling the groove 11h. As a result, the groove 11h is not formed, and the corners of the rectangular cross section are rounded.

In contrast, according to the present embodiment, the press surfaces K3 are configured to provide the spaces S discussed above. Therefore, at the time immediately after the begging of the downward movement of the upper die K1A, the protruded corner parts 11f are located in the corresponding space S and are not crashed by the press surfaces K3. Thus, the corners of the rectangular cross section are rounded, and at the same time, the groove 11h is formed between each corresponding two protruded corner parts 11f.

At the coating step S30, at the time of coating the liquid seal agent 12x to the intermediate portion 11a, the thickness of the liquid seal agent 12x is increased at each groove 11h in comparison to the rest of the intermediate portion 11a. In other words, the press surfaces K3 of the dies K1A, K2A are configured such that the grooves 11h have a sufficient depth to hold the liquid seal agent 12x in the groove 11h while limiting efflux of the liquid seal agent 12x from the groove 11h. Therefore, when the solidifying step S40 is completed, the thickness T of the portion of the seal film 12 at the recess 12a is larger than that of the rest of the seal film 12.

Furthermore, the configuration of the press surface K3 is set to form the sufficient depth of the groove 11h to enable the formation of the recess 12a, which is recessed along the groove 11h, in the seal film 12 upon completion of the solidifying step S40.

The terminals 10, which are manufactured in the above-described manner, are placed in the resin molding die, which is used for the resin molding of the base portion 25, and the terminals 10 are insert molded integrally with the base portion 25. In this way, the resin of the base portion 25 is filled in the recesses 12a. As a result, the base portion 25 has protrusions 25a, each of which is fitted into the recesses 12a, respectively (see FIG. 13).

As discussed above, according to the present embodiment, at the second press step S20, the planar rod 11x is processed through the press working, so that the corners 11ax1-11ax4 of the rectangular cross section 11sx of the intermediate portion 11ax are rounded, and at the same time, the groove 11h is formed in each of the two end surfaces 11g of the cross section 11sx of the intermediate portion 11a.

In this way, the liquid seal agent 12x tends to be held in the grooves 11h at the coating step S30. Thus, the thickness T of the corresponding portion of the seal film 12, which is located in the corresponding one of the recesses 12a, becomes larger than that of the rest of the seal film 12, which is other than the recesses 12a. As a result, the sealing performance of the seal film 12 can be improved. Furthermore, when the press working is performed, the grooves 11h are formed simultaneously with the process of rounding the corners of the rectangular cross section 11sx. Thus, the grooves 11h are formed without requiring addition of an additional step.

Furthermore, according to the present embodiment, the grooves 11h are formed in the end surfaces 11g of the intermediate portion 11a, and the seal film 12 is formed on the surface of the intermediate portion 11a, which includes the surface of each of the grooves 11h. Thus, the thickness T of the corresponding portion of the seal film 12, which is located in the corresponding one of the recesses 12a, becomes larger than that of the rest of the seal film 12, which is other than the recesses 12a. As a result, the sealing performance of the seal film 12 can be improved.

Furthermore, according to the present embodiment, at the coating step S30, the liquid seal agent 12x is coated on the grooves 11h such that the recesses 12a, which are recessed along the grooves 11h, respectively, are formed in the seal film 12. In other words, the recesses 12a, which are recessed along the grooves 11h, respectively, are formed in the seal film 12.

In this way, the parts (the protrusions 25a) of the housing 20 can be embedded into the recesses 12a of the terminal 10. Thereby, it is possible to limit the deformation of the housing 20, which is caused by thermal strain of the terminal 10.

(Other Embodiments)

The present disclosure is not limited to the above embodiments, and the above embodiments may be modified as follows. Furthermore, the features of each embodiment may be freely combined with the features of the other embodiment(s).

Figure 16:
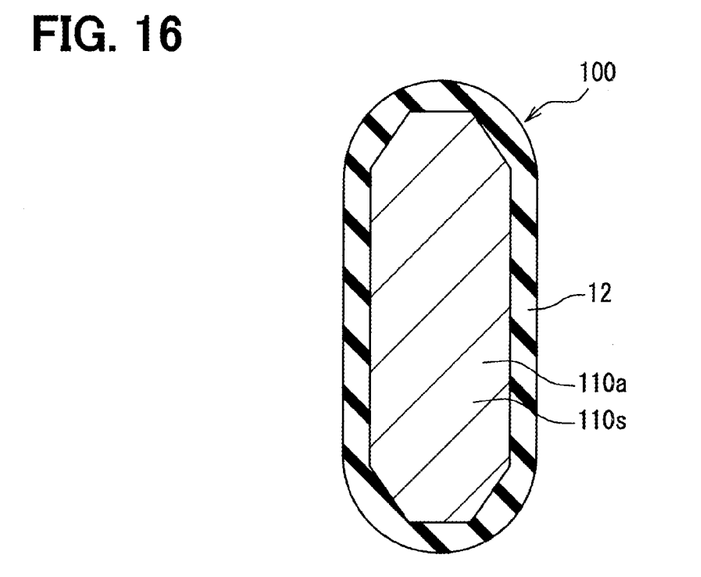
FIG. 16 is a diagram showing a modification of the terminal.

(A) In the above embodiments, as shown in FIG. 3, the corners of the intermediate portion 11a of the electrically conductive member 11 are configured into the arcuate shape. However, the intermediate portion 11a is only required to have the shape, in which the corners of the rectangular shape are rounded, and it is only required that the intermediate portion 11a does not have the edges 91a shown in FIG. 17. Specifically, the term "rounded" is not limited to the case where the corner is exactly processed to have the arcuate shape, and the term "edge" refers to an angled part having an angle of equal to or smaller than 90 degrees. Therefore, for example, as in a case of a terminal 100 shown in FIG. 16, the intermediate portion 110a of the electrically conductive member may have a cross section 110s, in which corners of the cross section 110s are chamfered. In such a case, an angle between each adjacent two sides of the cross section 110s is larger than 90 degrees.

(B) At the coating step S30 of FIG. 4, the liquid seal agent 12x may be dropped over the intermediate portion 11a to coat the intermediate portion 11a with the liquid seal agent 12x. Alternatively, the liquid seal agent 12x may be received in a container, and the intermediate portion 11a may be immersed into the liquid seal agent 12x in the container to coat the intermediate portion 11a with the liquid seal agent 12x.

(C) In the second embodiment, the recesses 12a, which are recessed along the grooves 11h, respectively, are formed in the seal film 12. Alternatively, while the grooves 11h are formed in the end surfaces 11g of the intermediate portion 11a, the seal film 12 may be formed such that the recesses 12a are not formed in the seal film 12.

(D) In each of the above embodiments, the seal film 12 is formed in the range A2 of the intermediate portion 11a in the electrically conductive member 11. Alternatively, the seal film 12 may be formed along the entire range A1 of the portion of the terminal 10, which extends through the base portion 25.

The invention claimed is:

1. A method for manufacturing a terminal that includes:
an electrically conductive member that has an electrical connection, which is formed at an end portion of the electrically conductive member, wherein the electrical connection is connectable with an external electrical conductor; and
a seal film that is formed in a surface of a predetermined portion of the electrically conductive member, which is other than the electrical connection, the method comprising:
forming the electrically conductive member by processing a planar rod, which has a rectangular cross section, such that each of four corners of the rectangular cross section of a corresponding portion of the planar rod, which is other than an end portion of the planar rod, is rounded to form the predetermined portion of the electrically conductive member, while the end portion of the planar rod, which has the rectangular cross section, is made as the electrical connection;
coating a liquid seal agent on the predetermined portion; and
solidifying the liquid seal agent, which is coated on the predetermined portion, to form the seal film.

2. The method for manufacturing according to claim 1, comprising forming an intermediately shaped product, which includes the planar rod as one of a plurality of planar rods connected together, through press working of a plate material before the forming of the predetermined portion of the electrically conductive member, wherein:
the forming of the electrically conductive member includes simultaneously rounding the four corners of the rectangular cross section of the corresponding portion in each of the plurality of planar rods through press working of the intermediately shaped product.

3. The method for manufacturing according to claim 1, wherein the forming of the electrically conductive member includes simultaneously rounding the four corners of the rectangular cross section of the corresponding portion through press working of the planar rod by using a pair of dies that have four press surfaces, each of which is opposed to a corresponding one of the four corners of the rectangular cross section of the corresponding portion and is configured into an arcuate shape.

4. The method for manufacturing according to claim 1, wherein the forming of the electrically conductive member includes forming a groove in at least one of two end surfaces of the rectangular cross section of the corresponding portion, which are opposed to each other in a longitudinal direction of the rectangular cross section, simultaneously with the rounding of each of the four corners of the rectangular cross section of the corresponding portion through press working of the planar rod.

5. The method for manufacturing according to claim 4, wherein the coating of the liquid seal agent includes coating the liquid seal agent in the groove such that a recess, which is recessed along the groove, is formed in the seal film.

6. A terminal comprising:
an electrically conductive member that has an electrical connection which is formed at an end portion of the electrically conductive member, wherein the electrical connection is connectable with an external electrical conductor; and
a seal film that is formed in a surface of a predetermined portion of the electrically conductive member, which is other than the electrical connection, wherein:
a cross section of the electrical connection has a rectangular shape; and
a cross section of the predetermined portion has a shape that is formed by rounding each of four corners of a rectangle; and the seal film, which is coated on the predetermined portion, is a liquid seal agent.

7. The terminal according to claim 6, wherein:
the terminal is placed to extend from an inside to an outside of a housing that is placed in an environment exposed to liquid fuel; and
the seal film seals between the housing and the electrically conductive member.

8. The terminal according to claim 6, wherein:
a groove is formed in at least one of two end surfaces of the cross section of the predetermined portion, which are opposed to each other in a longitudinal direction of the cross section; and the seal film is formed in a surface of the predetermined portion, which includes the groove.

9. The terminal according to claim 6, wherein a recess, which is recessed along the groove, is formed in the seal film.

* * * * *